United States Patent [19]

Dowd

[11] Patent Number: 4,796,837
[45] Date of Patent: Jan. 10, 1989

[54] LEG SEAT TRACK FITTING WITH IMPROVED BEARING MEMBER

[76] Inventor: Eugene G. Dowd, 4711 Clubview Dr., Westlake Village, Calif. 91362

[21] Appl. No.: 182,103

[22] Filed: Apr. 15, 1988

Related U.S. Application Data

[63] Continuation-in-part of Ser. No. 78,202, Jul. 27, 1987.

[51] Int. Cl.⁴ ............................................. B64D 11/06
[52] U.S. Cl. .............................. 244/122 R; 248/503.1; 410/105; 410/101
[58] Field of Search ............. 244/122 R, 118.6, 118.1; 248/503, 503.1; 410/101, 102, 104, 105, 115

[56] References Cited

U.S. PATENT DOCUMENTS

| | | | |
|---|---|---|---|
| 3,282,229 | 11/1966 | Elsner | 410/105 |
| 4,256,424 | 3/1981 | Knox et al. | 410/105 |
| 4,501,404 | 2/1985 | Nelson | 248/503.1 |
| 4,708,549 | 11/1987 | Jensen | 410/105 |
| 4,718,719 | 1/1988 | Brennan | 244/122 R |

Primary Examiner—Galen Barefoot
Assistant Examiner—Rodney Corl
Attorney, Agent, or Firm—Whann & Connors

[57] ABSTRACT

Disclosed is a leg seat track fitting used to removably secure the leg of an airplane seat to the floor of the fuselage. The fitting has a body member, including a wall element from which a series of pairs of tabs project outwardly. These tabs engage the track in which the fitting is carried. A pivotable detent element attached to one end of the wall element secures the fitting in position when depressed. A yoke element mounted at another end of the wall is moved towards and away from the body member by a spring loaded screw. This yoke includes a pair of plungers which straddle the wall and engage the floor of the track when the yoke is moved toward the body member. The detent element and plungers resist sliding movement of the fitting in its track. To absorb energy when torque is exerted on the seat, a spherical bearing carries a pin which passes through this bearing member and attaches to the leg of the seat. The bearing member comprises a tubular member having a raised, segmented spherical central portion received in an opening in the body member. A pair of ring elements having internal spherical surfaces which conform to the spherical central portion are press fitted in the opening to hold the tubular member in place.

10 Claims, 3 Drawing Sheets

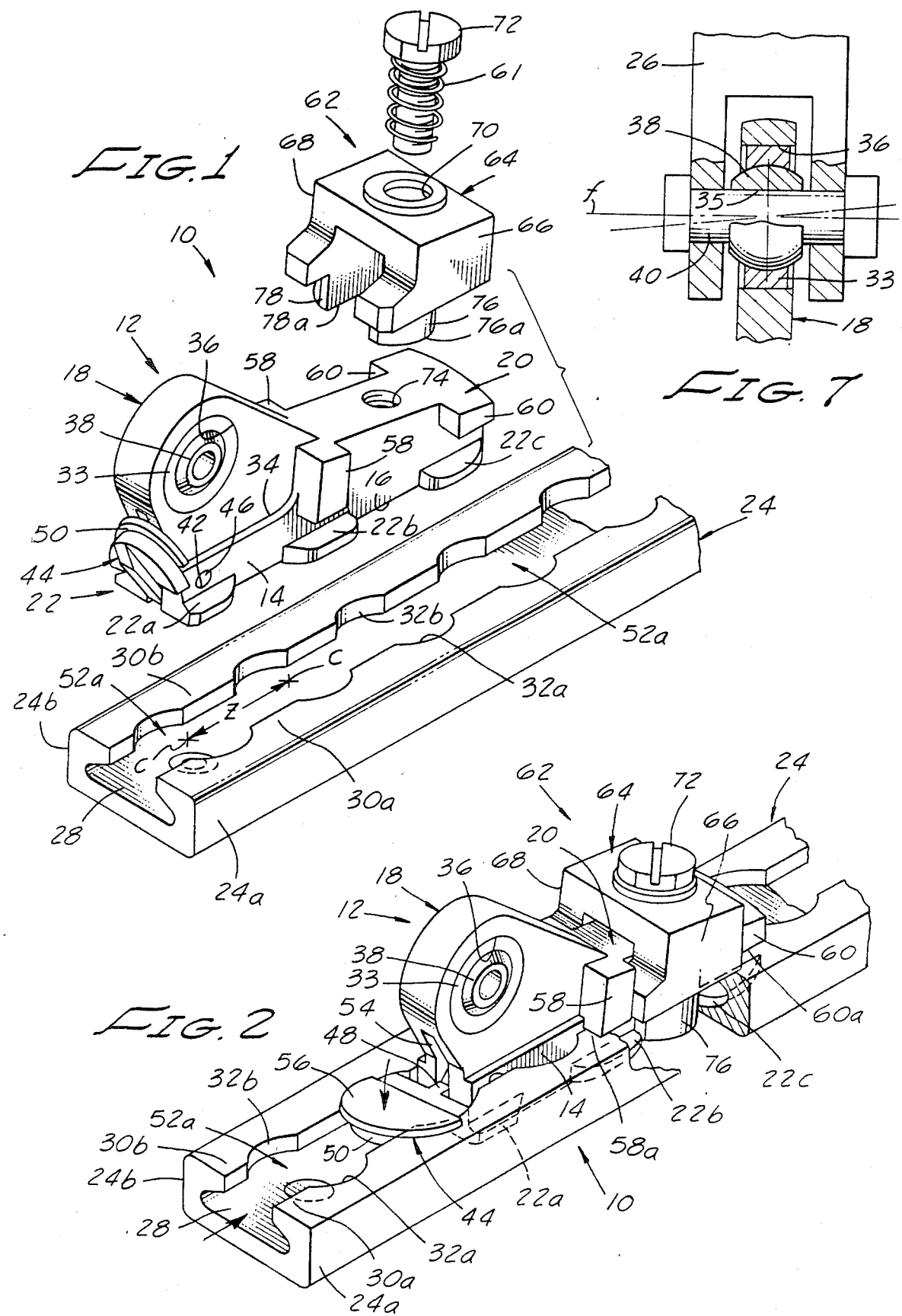

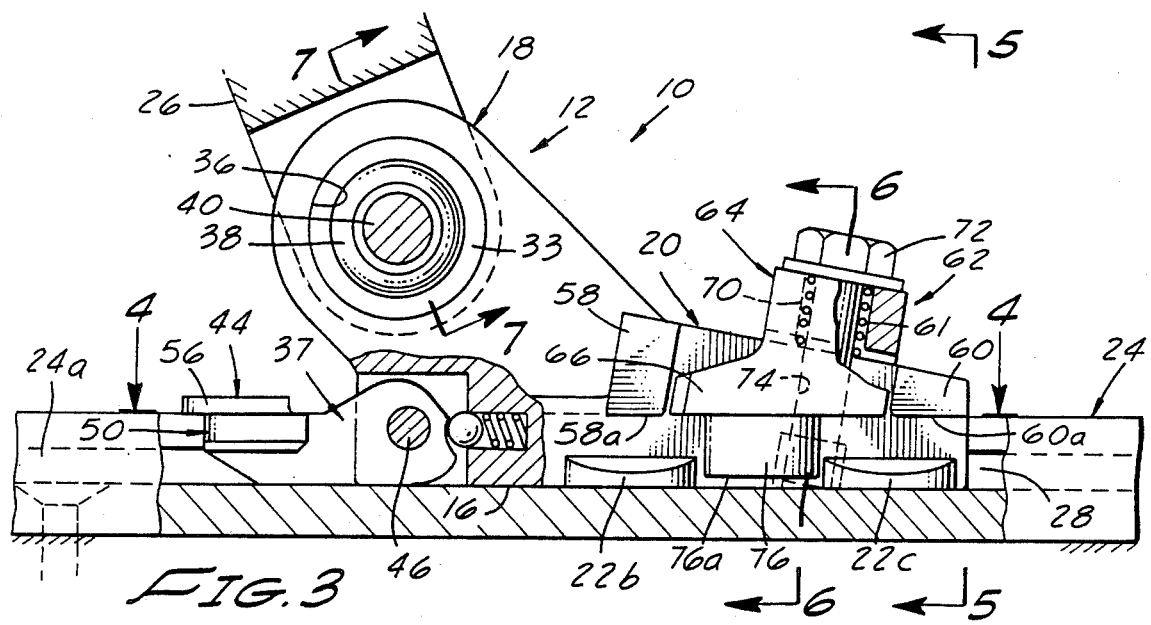

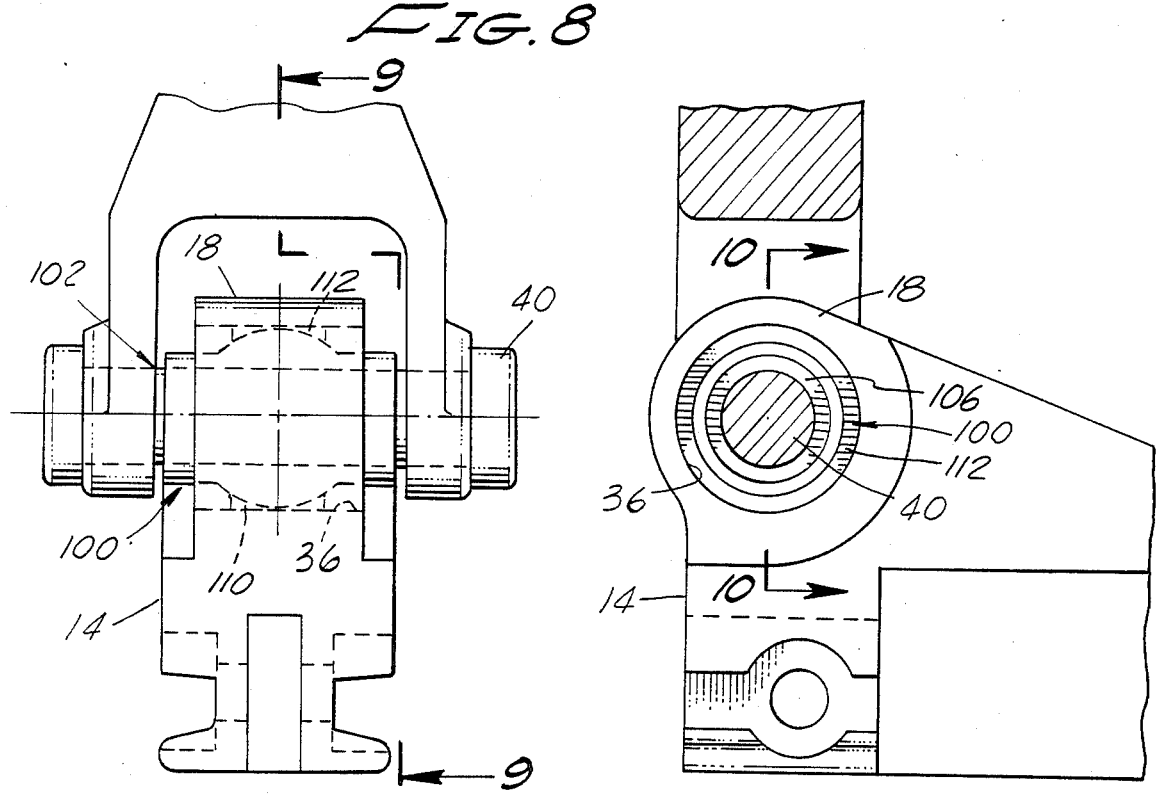
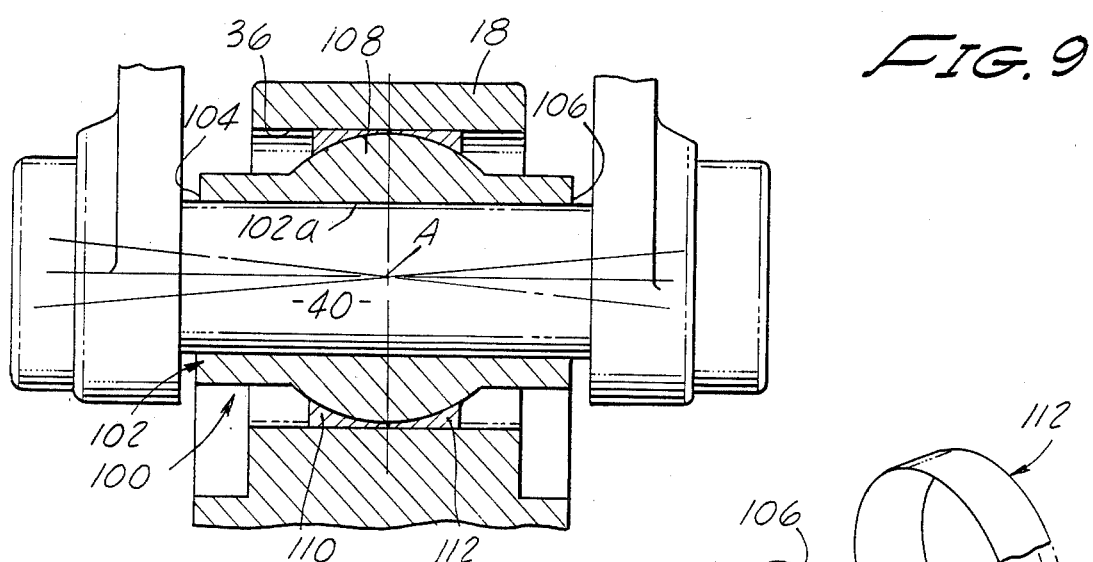
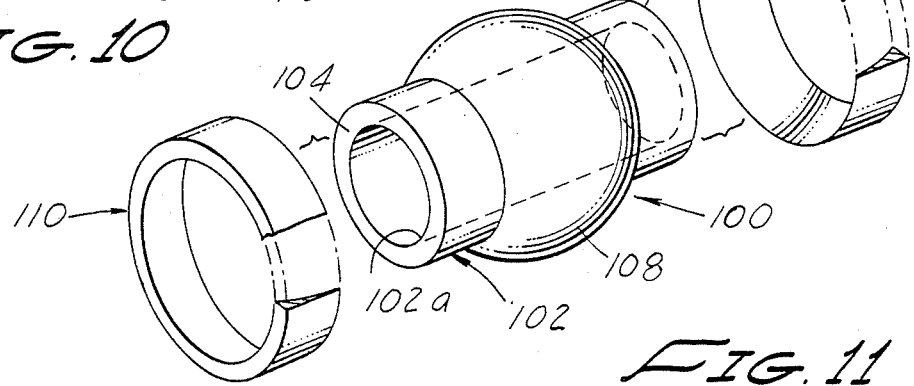

LEG SEAT TRACK FITTING WITH IMPROVED BEARING MEMBER

BACKGROUND OF THE INVENTION

1. Related Patent Applications

This application is a continuation-in-part application of U.S. Ser. No. 07/078,202, filed July 27, 1987, and entitled Leg Seat Track Fitting With Improved Bearing Member, which is incorporated herein by reference and made a part of this patent application.

2. Field of the Invention

This invention relates to a leg seat track fitting used to secure the leg of an airplane seat securely within a track mounted to fuselage floor, and in particular to a track fitting that may be easily removed from the track yet secures the seat in the track, avoiding noisy rattling and preventing sliding movement of the seat in the track.

3. Background Discussion

In commercial passenger aircraft it is common to removably mount the passenger seats in a track secured to the fuselage floor. A track fitting is employed to do this which includes a body member having a plurality of tabs extending outwardly from the side of the body member which engage the underside of a lip in the track. A detent element is sometimes used to provide sufficient force to hold the tabs snug in the track and prevent sliding movement of the seat in the track. Anti-rattle devices consisting of wedge-type elements are also sometimes employed. Each leg of the passenger seat is attached to a fitting secured to the track. If the airplane stops suddenly, for example, in a crash landing, the seat will be subjected to very high shock loads that could result in the fitting pulling free from the track. The fitting is designed to resist movement when subjected to such shock loads so that it will not slide forwards or backwards in the track or pull from the track due to the seat rotating about the yaw, pitch or roll axis.

SUMMARY OF THE INVENTION

The present invention provides an improved leg seat track fitting which is simple to manufacture and easy to install, prevents sliding movement of the fitting in its track, secures the fitting in the track so that rattling is avoided, and can withstand extremely high loads before pulling free from the track.

There are several features of this invention, no single one of which is solely responsible for its desirable attributes. Without limiting the scope of this invention, as expressed by the claims, its more prominent features will now be discussed briefly. After considering this discussion, and particularly after reading the section of this application entitled DETAILED DESCRIPTION OF THE PREFERRED EMBODIMENT, one will understand how the features of this invention provide the advantages discussed above.

One feature of the present invention is the use of a body member having outwardly projecting tabs that are accommodated in the track member and engage the underside of a lip in the track member to hold the fitting securely in position. In accordance with this invention, at least three pairs of tabs are used. These tabs resist forces acting on the seat which would cause it to rotate.

The second feature of this invention is the employment of a spherical bearing member located in the body member. This spherical bearing member has an opening therein adapted to receive a pin which passes through the bearing member and is secured to the leg of the seat. This spherical bearing member will roll or pivot in any direction, thus accommodating slight side-to-side pivoting of the chair. The bearing member fits snugly in its race, and acts as a shock absorber. Thus, as a twisting force acts on the seat leg, the leg turns slightly, with the bearing resisting the twisting force to absorb energy.

The third feature of this invention is the use of a detent member at one end of the body member and a yoke mounted at the other end of the body member which includes a pair of plunger elements. The yoke is secured in position by a screw or similar threaded fastener and can be moved towards or away from the body member. When the yoke is moved towards the body member, the plunger elements engage the floor of the track, pressing firmly against the floor to exert an upwardly acting force on the body member to pull the tabs securely against the underside of the lip and prevent rattling. The plunger elements and detent member provide resistance against sliding movement of the fitting in the track.

The fourth feature of this invention is the use of a novel spherical bearing member to hold the pin. This bearing member includes a tubular member which is seated in an opening in the body member and retained in position by a pair of retainer elements press-fitted into the opening. The tubular member has opposed ends connected by a passageway which receives the pin. There is a raised external portion intermediate the ends which has a segmented convex, spherical bearing surface. The retainer elements preferably are rings having internal, segmented, concave surfaces which conform to the spherical bearing surface. Each of the rings is on opposite sides of the raised external portion and press-fitted into the opening to hold the tubular member in position. This provides an inexpensive and easy to assemble spherical bearing member.

The preferred embodiments of this invention will now be discussed in detail. These embodiments show the device of this invention being used with a conventional airplane seat track mounted on the floor of the fuselage of the airplane.

BRIEF DESCRIPTION OF THE DRAWING

The leg seat track fitting of this invention is illustrated in the drawing, with like numerals indicating like parts, and in which:

FIG. 1 is an exploded perspective view of the leg seat track fitting of this invention.

FIG. 2 is a perspective view of the leg seat track fitting of this invention assembled and locked in position in a track.

FIG. 3 is a side elevational view of the leg seat track fitting of this invention in its track with sections broken away.

FIG. 4 is a cross-sectional view taken along line 4—4 of FIG. 3.

FIG. 5 is a cross-sectional view taken along line 5—5 of FIG. 3.

FIG. 6 is a cross-sectional view taken along line 6—6—6 of FIG. 3.

FIG. 7 is a cross-sectional view taken along line 7—7 of FIG. 3.

FIG. 8 is a front elevational view of an alternate embodiment of this invention employing a low cost, easy to assemble spherical bearing member.

FIG. 9 is a cross-sectional view taken along line 9—9 of FIG. 8.

FIG. 10 is a cross-sectional view taken along line 10—10 of FIG. 9.

FIG. 11 is an exploded perspective view of the alternate embodiment of the spherical bearing member employed in this invention.

DESCRIPTION OF THE PREFERRED EMBODIMENT

As shown in FIGS. 1 through 7, the leg seat track fitting 10 of this invention includes a metal body member 12 having a wall 14 which projects upwardly from a generally flat base 16, an enlarged leg holding section 18 integral with the wall and a yoke mounting section 20 also integral with the wall. A series of pairs of tabs 22, with each tab of each pair extending outwardly from opposite sides of the wall 14, provide means for holding the seat track fitting 10 in place in a conventional seat track 24.

Although the seat track 24 does not form a part of this invention, it is designed to coact with the seat track fitting 10 to removably secure a leg 26 (FIG. 3) of an airplane seat in position. This track 24 has generally elongated rectangular shaped sides 24a and 24b with a groove 28 running lengthwise along the longitudinal axis of the track. A pair of lips 30a and 30b partially cover the groove 28, and these lips are spaced apart so that their inside edges are parallel and provide a gap therebetween. Spaced apart along these lips are pairs of opposing semi-circular slots 32a and 32b. The center points c (FIG. 1) between these slots 32a and 32b are spaced apart a fixed distance z and this distance z is equal to the distance d (FIG. 4) between the center points a between adjacent pairs of tabs 22. As shown in FIGS. 1 and 4, this enables the fitting 10 to be placed in the track 24 by aligning each of the tabs 22 with a pair of opposed slots 32a and 32b and dropping the fitting 10 into the groove 28. The fitting 10 is then moved along the longitudinal axis of the groove 28 to bring the top surfaces of the tabs 22 into alignment with the lip undersides between adjacent slots.

The enlarged leg holding section 18 is formed as a generally flat piece having opposed parallel sides with the distance between the sides being slightly less than the thickness of the wall 14. This leg holding section 18 is integral with the wall 14 along offset ledges 34. There is a central circular opening 36 in the leg holding section 18 and there is forced fitted therein a bearing race 33 with spherical bearing member 38 lodged snugly therein. The bearing member 38 is capable of moving through an angle of about 11 to about 26 degrees depending on the configuration of the seat leg. The forward tabs 22a are mounted directly beneath the opening 36 and there is an orifice 42 in the wall 14 immediately above the tabs 22a.

As illustrated in FIG. 7, with a pin 40 extending through a hole 35 in the bearing member 38, the bearing member provides some rotational movement about the horizontal axis f passing through the center of the opening 36. This pin 40 is used to hold the seat leg 26 in position. The spherical bearing member 38 resists the torque exerted against the seat, but will move within its race 33. Thus energy will be absorbed. When the seat is subjected to s shock load, the pin pivots slightly, and if the load is not extreme, turns slightly rather than breaking.

A pivotably mounted metal detent 44 is attached to the forward end of the body member 12 by a rod 46 extending through the orifice 42 and into a finger 48 (FIG. 4) of the detent 44 to allow the detent to move between an up position, as shown in FIG. 1, and a down position, as shown in FIG. 2. The detent has a head section 50 which is generally circular and which is received in a receptacle section 52 provided between the forward opposing slots 32a and 32b in the track 24. The finger 48 extends outwardly from the head section 50 into a recess 54 in the wall, with the rod 46 passing through the finger. The head section 50 includes a cap piece 56 which rests on the top surfaces of the lips 30a and 30b when the detent 44 is depressed as shown in FIGS. 2 and 3. The detent 44 engages the edges of the slot and thus prevents sliding movement along the longitudinal axis of the fitting 10 in the track 24. A spring loaded lever arm 37 acts to wedge the detent 44 in position when the detent is depressed.

The yoke mounting section 20 is defined by two pairs of guide blocks 58 and 60. These blocks 58 and 60 have lower ends 58a and 60a which terminate, respectively, above the tabs 22b and 22c to provide a space so that the track lips 30a and 30b fit snugly between these ends of the blocks and the tabs 22b and 22c.

A metal yoke 62 is movably mounted to the yoke mounting section 20 which, when tightened, prevents sliding movement and rattling. This yoke 62 includes a block element 64 having two downwardly projecting sidewalls 66 and 68 which provide a cavity 39 therebetween which allows the yoke to be seated on the body member 12. A threaded passageway 70 in the top of the block 64 enables a screw 72 to be passed through the block and into threaded opening 74 in the top of the wall. A spring 61 seated in the cavity 39 normally urges the yoke 62 outwardly. The block 64 is so positioned on the body member 12 so that the sidewalls 66 and 68 are disposed between the forward blocks 58 and the rear block 60. The screw 72 is at a slight angle so that the block 64 moves downwardly and towards the forward end as the screw is tightened. This pushes the ends 66a and 68a of the sidewalls 66 and 68 towards the lips 30a and 30b on tightening. A pair of plungers 76 and 78 integral with the sidewalls 66 and 68, but offset inwardly, extend downwardly and between the two pairs of rear tabs 22b and 22c. These plungers 76 and 78 have a semi-circular cross-section and fit snugly in the receptacle section 52a. To prevent rattling, either the ends 76a and 78a of the plungers engage the floor of the track 24 when the yoke 62 has been moved toward the body member its maximum length of travel upon tightening of the screw 72, or the ends 66a and 68a press firmly against the top of the lips 30a and 30b.

The body member 12, including sections 18 and 20, blocks 58 and 60, wall 14 and tabs 22, are all integral and formed from the same unitary piece of metal. Thus, the body member 12 is a sturdy metal structure which can withstand extremely high sheer forces.

OPERATION

To use the track fitting 10 of this invention, one places it in the track 24, with the yoke 62 raised, by positioning the tabs 22 opposite corresponding receptacle sections 52 in the track and then seating the fitting in the track by moving it lengthwise in the groove 28 to bring the tabs underneath the lips 30a and 30b between adjacent receptacle sections. This brings the head section 50 of the detent 44 into an overlying position with respect to the forward receptacle section 52a and the two plungers 76 and 78 into overlying position with receptacle section 52b. The head section 50 is pushed downwardly so that the finger 48 will pivot and spring loaded lever arm 37 will bear against the floor 40 to provide an upward acting force tending the pull the forward end of the fitting upwardly, pressing the tabs 22a against the underside of the lips 30a and 30b. The head section 50, bearing against the edges of the slots 32a and 32b, resists sliding movement of the fitting 10 within track. The screw 72 is tightened to pull the yoke 62 inwardly towards the body member 12 depressing the spring 61, with the plungers 76 and 78 passing through the receptacle section 52b and pressing against the floor of the track 24. This pushes the tabs 22b and 22c upwardly against the undersides of the lips 30a and 30b. The plungers 76 and 78 bear against the edges of the slots 32a and 32b forming the receptacle section 52a to resist sliding movement of the fitting 10 in the track.

There is thus provided a fitting structure which prevents sliding movement within the groove 28 of the track. The pin 40 is inserted through the seat leg 26 and the opening 36 in the spherical bearing 38 and secured to the leg. Thus, if there is any torque on the seat, the bearing 38 will move slowly within the race 33 to absorb energy and minimize the sheering forces acting to sever the pin 40.

ALTERNATE EMBODIMENT

An alternate form of spherical bearing member, designated as 100, is illustrated in FIGS. 8–11. The bearing member 38 is suitable; however, it is relatively expensive compared to bearing member 100.

The bearing member 100 comprises a tubular member 102 received in the generally circular opening 36 in the leg holding section 18 of wall 14. The tubular member 102 has a raised central portion 108 between the opposed open ends 104 and 106 of the tubular member. A passageway 102a extends between the open ends 104 and 106 and the pin passes through this passageway and is connected to the seat. The ends 104 and 106 have a diameter substantially less than the diameter of the circular opening 36 and the raised central portion 108 at its midsection has a diameter which is only slightly less than the diameter of the circular opening. This raised central portion 108 has an exterior surface in the form of a segment of a sphere. The tubular member 102 is an integral piece of steel and is either forged, cast or machined to give it the desired shape.

A pair of ring elements 110 and 112 hold the tubular member 102 in position in the circular opening 36. Each of these ring elements 110 and 112 has an outside diameter which is slightly larger than the diameter of the circular opening 36. This allows the two rings to be press-fitted into position as illustrated in FIG. 10. Each ring has an internal surface 114 which is concave relative to the convex spherical surface of the raised central portion 108 of the tubular member 102. The spherical surfaces of the ring elements 110 and 112 and the bearing surface of the raised central portion 108 conform so that the tubular member may tilt in any direction around its central point A as shown in FIG. 10. Thus the pin 40 which connects the bearing member 100 to the airplane seat may tilt about its longitudinal axis to absorb shock loads.

SCOPE OF THE INVENTION

The above description presents the best mode contemplated of carrying out the present invention. This invention is, however, susceptible to modifications and alternate constructions from the embodiments shown in the drawing described above. Consequently, it is not the intention to limit this invention to the particular embodiments disclosed. On the contrary, the intention is to cover all modifications and alternate constructions coming within the spirit and scope of the invention as generally expressed by the claims.

I claim:

1. A leg seat track fitting adapted to be removably secured in a track carrying an airplane seat wherein said track has an elongated groove disposed lengthwise in the track which is partially covered by a pair of spaced apart lips which are parallel to each other and provide a gap there between and have therein a series of aligned pairs of slots which provide a series of receptacle sections in the said track fitting comprising
a body member having a base and a wall element extending outwardly from the base, an enlarged leg holding section integral with the wall element and including a spherical bearing member for receiving pin means which is attached to the leg of the airplane seat, and a rear yoke mounting section integral with the wall, said spherical bearing member being received within an opening in the wall element and comprising (a) a tubular member having opposed open ends connected by a passageway which receives the pin means, said tubular member having a raised, external portion intermediate said ends which has a segmented, convex spherical bearing surface, and (b) a pair of retainer elements having internal, segmented, concave, spherical surfaces which conform to the spherical bearing surface, each retainer element being on opposite sides of the raised external portion of the tubular member and press fitted in the opening in the wall element to hold the tubular member in position, said base being generally flat and adapted to abut the floor of the track when the fitting is placed in the track, with the wall extending outwardly through the gap between the lips, integral with the body member, a plurality of spaced apart pairs of tabs, with the tabs of each pair being on opposite sides of the wall and projecting outwardly from the wall generally at a right angle to the wall, with the distance between said pairs of tabs being equal to the distance between adjacent pairs of receptacle sections, said tabs being adapted to grip the underside of the lips between adjacent pairs of receptacles when aligned therewith and the fitting received in the groove, said tabs also being adapted to be received in the groove by passing through corresponding receptacles and laterally moving the fitting in the groove to bring the tabs into registration with the underside of the lips between adjacent pairs of slots, a detent element pivotally mounted to the end of the body member opposite the yoke mounting section and adjacent the base, said detent element being adapted to being received snugly in a receptacle section upon insertion therein, said detent element upon being inserted into a receptacle acting to prevent sliding movement of the fitting in the track, and a yoke member mounted on the yoke mounting section and including a screw-type fastener for moving the yoke member towards and away from the body member, said yoke member having a pair of plunger elements, with each plunger element being on opposite sides of the wall and adapted to be received snugly in a receptacle section.

2. The fitting of claim 1 wherein the slots have a generally semi-circular configuration.

3. The fitting of claim 1 wherein the yoke member mounting section has guide blocks on opposite sides thereof which are integral with the body member and between the leg holding section and the yoke mounting section.

4. The fitting of claim 1 wherein each plunger element has a generally semi-circular cross-section.

5. A leg seat track fitting adapted to be removably secured in a track carrying an airplane seat wherein said track has an elongated groove disposed lengthwise in the track which is partially covered by a pair of spaced apart lips which are parallel to each other and provide a gap there between and have therein a series of aligned pairs of slots which provide a series of receptacle sections in the track, said track fitting comprising a body member having a base and a wall element extending outwardly from the base, an enlarged leg holding section integral with the wall element and including a spherical bearing member for receiving pin means which is attached to the leg of the airplane seat, said spherical bearing member being received within an opening in the wall element and comprising (a) a tubular member having opposed open ends connected by a passageway which receives the pin means, said tubular member having a raised, external portion intermediate said ends which has a segmented, convex spherical bearing surface, and (b) a pair of retainer elements having internal, segmented, concave, spherical surfaces which conform to the spherical bearing surface, each retainer element being on opposite sides of the raised external portion of the tubular member and press fitted in the opening in the wall element to hold the tubular member in position, said base being generally flat and adapted to abut the floor of the track when the fitting is placed in the track, with the wall extending outwardly through the gap between the lips, integral with the body member, a plurality of spaced apart pairs of tabs, with the tabs of each pair being on opposite sides of the wall and projecting outwardly from the wall generally at a right angle to the wall, with the distance between said pairs of tabs being equal to the distance between adjacent pairs of receptacle sections, and said tabs being adapted to grip the underside of the lips between adjacent pairs of receptacles when aligned therewith and the fitting received in the groove, said tabs also being adapted to be received in the groove by passing through corresponding receptacles and laterally moving the fitting in the groove to bring the tabs into registration with the underside of the lips between adjacent pairs of slots.

6. The track fitting of claim 5 including a rear yoke mounting section integral with said wall and a detent element pivotally mounted to the end of the body member opposite the yoke mounting section and adjacent the base, said detent element being adapted to be received snugly in a receptacle section upon insertion therein, said detent element upon being inserted into a receptacle acting to prevent sliding movement of the fitting in the track.

7. The track fitting of claim 6 including a yoke member mounted on the yoke mounting section and including a screw-type fastener for moving the yoke member towards and away from the body member, said yoke member having a pair of plunger elements, with each plunger element being on opposite sides of the wall and adapted to be received snugly in a receptacle section.

8. The track fitting of claim 7 wherein the slots have a generally semi-circular configuration.

9. The track fitting of claim 8 wherein the yoke member mounting section has guide blocks on opposite sides thereof which are integral with the body member and between the leg holding section and the yoke mounting section.

10. The track fitting of claim 9 wherein each plunger element has a generally semi-circular cross-section.

* * * * *